United States Patent [19]

Rice

[11] 4,021,523

[45] May 3, 1977

[54] METHOD OF EXTRUDING PLASTIC FILM

[75] Inventor: Richard M. Rice, Afton, Va.

[73] Assignee: Reynolds Metals Company, Richmond, Va.

[22] Filed: Oct. 22, 1975

[21] Appl. No.: 624,602

Related U.S. Application Data

[62] Division of Ser. No. 438,185, Jan. 31, 1974, Pat. No. 3,932,103.

[52] U.S. Cl. ............................. 264/209; 165/180; 165/185; 219/10.49; 264/95; 264/219; 264/DIG. 46; 425/146; 425/379 R; 425/467
[51] Int. Cl.² ......................................... B29F 3/08
[58] Field of Search .......... 264/95, 89, 176 R, 209, 264/210 R, DIG. 46, 40.6, 219; 425/192, 191, 467, 379, 146; 165/180, 185, DIG. 3; 219/540, 10.49

[56] References Cited

UNITED STATES PATENTS

| | | | |
|---|---|---|---|
| 2,834,054 | 5/1958 | Maddock et al. | 264/209 |
| 3,029,474 | 4/1962 | Voigt et al. | 264/209 |
| 3,193,547 | 7/1965 | Schott, Jr. | 264/95 |
| 3,304,408 | 2/1967 | Finch et al. | 165/180 |
| 3,363,079 | 1/1968 | Schroyer | 219/10.49 |
| 3,609,809 | 10/1971 | Slicker | 425/144 |
| 3,629,549 | 12/1971 | Svendsen | 165/185 |
| 3,836,313 | 9/1974 | Stafford | 425/379 R |

*Primary Examiner*—Jeffery R. Thurlow
*Attorney, Agent, or Firm*—Glenn, Lyne, Gibbs & Clark

[57] ABSTRACT

A method of extruding plastic film is provided which employs a die comprising a die body having an inlet therein for receiving a plastic melt under pressure and having an annulus in the die in flow communication with the inlet and having a discharge orifice for extruding the plastic melt therefrom in tubular form. A heat conductive band is provided and supported by the die body and such band has a circumferential heat conductivity which is better than its radial heat conductivity; and, a heater is employed for heating the band with the band assuring heat is transmitted so that practically all points of an annular portion of the die body located immediately adjacent the band are substantially at the same temperature.

8 Claims, 10 Drawing Figures

U.S. Patent  May 3, 1977  Sheet 1 of 2  4,021,523
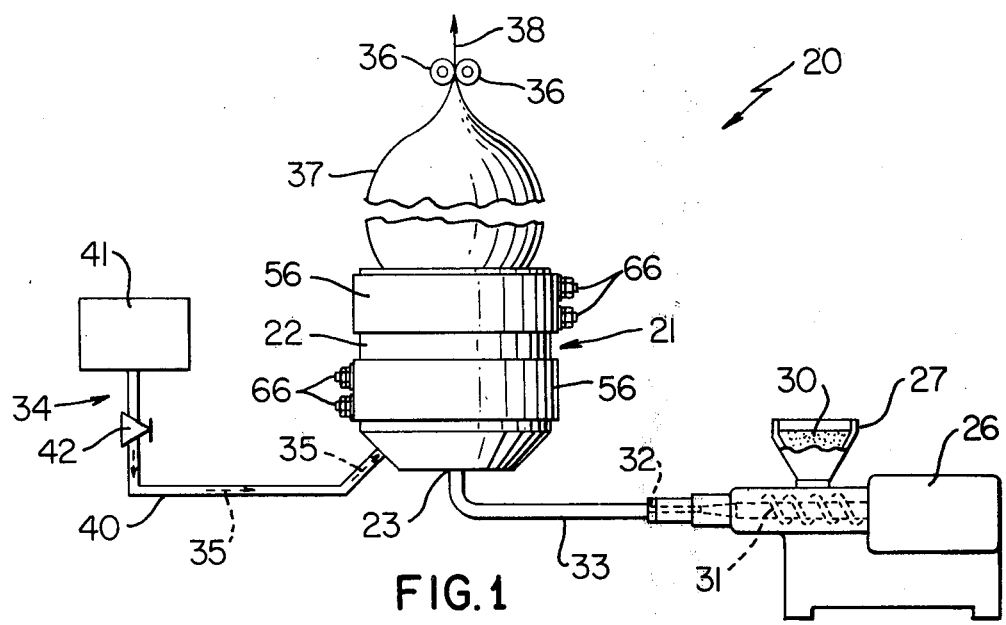
FIG.1
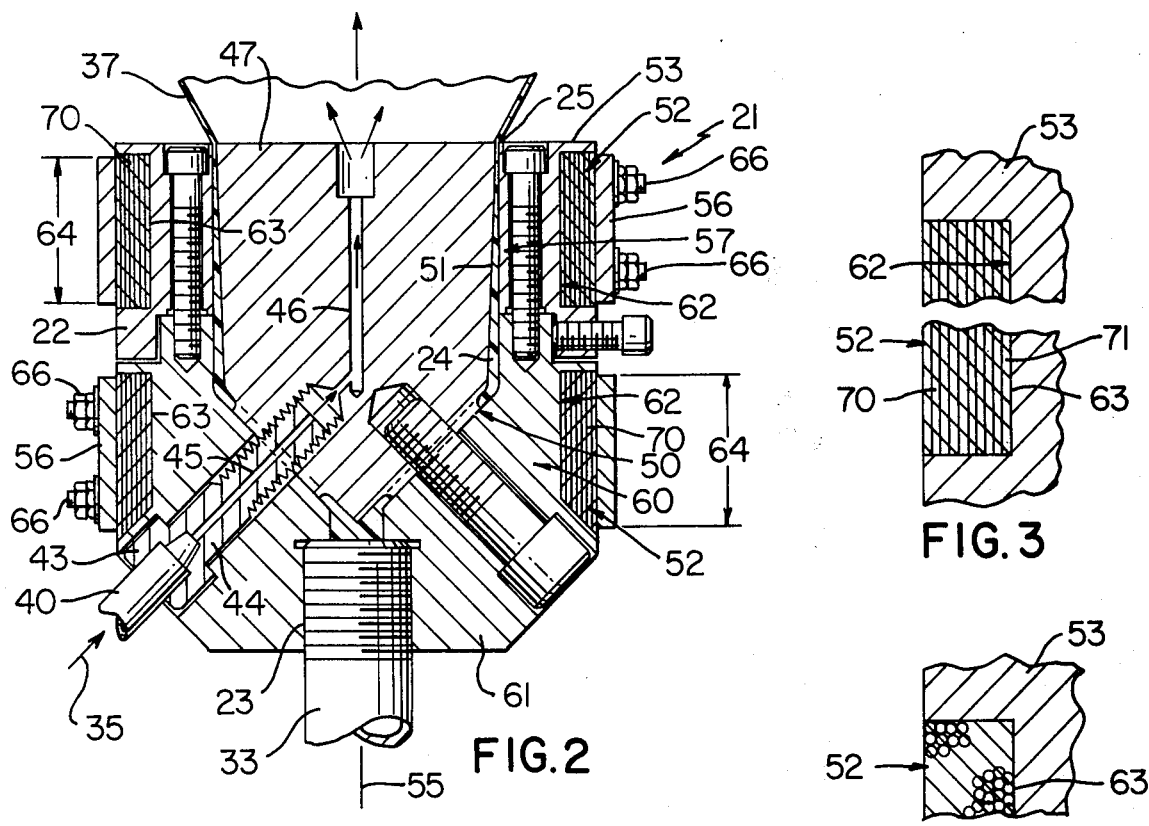
FIG.2
FIG.3
FIG.4

METHOD OF EXTRUDING PLASTIC FILM

This is a division, of application Ser. No. 438,185, filed Jan. 31, 1974 and now U.S. Pat. No. 3,932,103.

BACKGROUND OF THE INVENTION

There are numerous dies for and methods of extruding plastic film in current use which employ electrical resistance type heaters fastened against the outer surface of the die. Although such resistance heaters are very simple and economical they do not always provide uniform heating of the die being heated.

The main reasons for this lack of uniform heating are the nonuniformity of heat evolution from the resistance heater itself which is inherent in any such heater and the usually spotty contact between the resistance heater and the surface it engages. The nonuniformity of heat evolution in the resistance heater is due to normal variations in the gauge of the electrical resistance wire, wire spacing, insulation between wires or heating elements and in the case of a band heater the usual gap at the end of the band. The spotty contact is due to the fact that, in general, the heater and heated surfaces are both usually made of stiff metallic materials whereby adjoining surfaces do not readily conform to each other to provide optimum contact therebetween. Accordingly, it has been found that conductive heat transfer to the areas of contact is good while the locations not being contacted by the heater must be heated by convection and radiation only.

It is also well known that conductive heat transfer is much more efficient than non-contact heat transfer at the typical temperatures utilized in processing plastic film. Further, it has also been found that uniform contact by a heater against a die is limited by surface roughness, rust and scale, clamping pressure, differential thermal expansion and other factors which are difficult to control.

As a result of the above factors there is large spot-to-spot variation of heat flowing into the surface of a plastic film extrusion die being heated with electrical resistance heaters which causes large temperature variations within such die; and, these variations cause difficulties in processing the film and result in poor quality film.

In particular, it is well known that when heat degradable polymers are exposed to an erratic and poorly controlled environment there is a greater tendency for such polymers to degrade. Further, differential thermal expansion within a die causes warpage thereof and creates undesirable internal stresses which distort the flow channels and thus cause poor gauge uniformity of the die and hence poor gauge uniformity of the plastic film being extruded from such die. Finally, variations of melt viscosity due to temperature differences cause gauge and profile control problems in the associated die.

Temperature variations that result from non-uniform surface heat rates are reflected as temperature variations at the melt wetted surface and cause degradation of the polymer and poor gauge control in the die. In general, there is some smoothing effect of melt wetted surface temperature in a die because heat spreads from the hottest spot in the die toward the coolest spot in such die; however, in the currently used dies this is not rapid enough.

It has been found that the temperature variations at the melt wetted surfaces could be substantially reduced in amplitude or smoothed, if not entirely eliminated, if the resistance to circumferential heat conduction could be significantly decreased and the resistance to radial conduction significantly increased. Thus, if the spreading of heat from hot spots to cold spots could be accelerated by using materials having better circumferential heat conductivity than radial heat conductivity there would be minimum temperature variations of a plastic melt flowing through a die.

SUMMARY

This invention provides an improved die for and method of extruding plastic film wherein such die comprises a die body having an inlet therein for receiving a plastic melt under pressure and having an annulus in the die in flow communication with the inlet and having a discharge orifice for extruding the plastic melt therefrom in tubular form. A heat conductive band is provided and supported by the die body and such band has a circumferential heat conductivity which is better than its radial heat conductivity; and, a heater is employed for heating the band with the band assuring heat is transmitted so that practically all points of an annular portion of the die body located immediately adjacent the band are substantially at the same temperature.

Other details, uses, and advantages of this invention will be readily apparent from the exemplary embodiments thereof presented in the following specification, claims, and drawings.

BRIEF DESCRIPTION OF THE DRAWINGS

The accompanying drawings show present preferred embodiments of this invention together with test apparatus used in testing this invention and a graph of data obtained during tests, in which FIG. 1 is a schematic side elevation with parts in cross section and parts broken away illustrating one exemplary embodiment of the die and method of this invention including the emerging tubular film bubble and associated pinch rolls;

FIG. 2 is an enlarged cross-sectional view of the die of this invention taken essentially on a vertical plane as viewed in FIG. 1 and particularly illustrating the construction and arrangement of a plurality of heat conductive bands in the die body with the material used to make the heat conductive bands shown with an exaggerated thickness;

FIG. 3 is a greatly enlarged fragmentary cross-sectional view particularly illustrating the heat conductive band of FIG. 2 with the band material still drawn to an exaggerated thickness;

FIG. 4 is a view similar to FIG. 3 and illustrates a modified form of heat conductive band which may be used interchangeably with the band of FIG. 2;

DESCRIPTION OF ILLUSTRATED EMBODIMENTS

Figure 6:
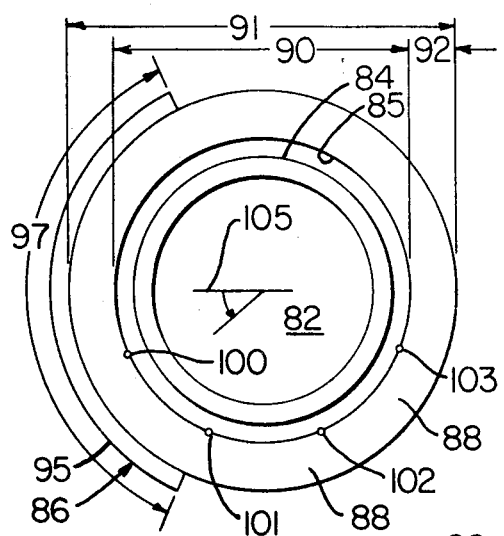
FIG. 6 is a view taken essentially on the line 6—6 of FIG. 5 illustrating the arcuate length and placement of the electrical resistance heater used in the test apparatus of FIG. 5 and also illustrating the placement of thermocouples on the steel ring to measure the temperature thereof.

Reference is now made to FIG. 1 of the drawings which illustrates an exemplary apparatus which is designated generally by the reference numeral 20 and is particularly adapted for extruding a polymeric or a plastic-like material such as polyvinyl chloride, nylon, or the like to produce a thin plastic film and the apparatus 20 comprises an extrusion die which is designated generally by the reference numeral 21. The die 21 has a die body 22 which has an inlet 23 therein for receiving a hot plastic melt 24, see FIG. 2, under pressure and the die 21 has an outlet in the form of a discharge orifice 25 for extruding the plastic melt therefrom in tubular form. The die 21 has simple and unique means for uniformly heating and thus assuring precision control of the temperature of the plastic melt as it flows through the die and as will be described in detail subsequently.

The apparatus 20 comprises an extruder 26 which supplies hot plastic melt 24 to the inlet 23 and such extruder 26 has a supply bin 27 which feeds the extruder 26 with a suitable solid plastic material 30 in flowable particulate form, such as, pellets, flakes, powder, or the like. The extruder has heating means (not shown) of known conventional construction for melting the plastic material 30 and a helical screw 31 is provided for forcing the molten material or melt 24 through an outlet 32 of the extruder 26 and through a conduit 33 to the die inlet 23.

The plastic melt 24 is supplied to the inlet 23 at a controlled temperature which is based on the physical and chemical properties of the plastic material 30 and the apparatus 20 has means which is designated generally by the reference numeral 34 for supplying a suitable gas, such as air, which is designated by dotted arrows 35 to the die 21 to inflate a tube produced by extrusion of the plastic melt 24 through the discharge orifice 25 and the tube is pinched by a pair of cooperating rollers 36 to trap a moving film bubble 37 between the die outlet and the rollers 36. The film tube 38 passing from the rollers 36 may be further processed in any suitable manner known in the art. For example, such film tube may be slit and the film stretched to increase its area and then chilled to retain it in its stretched condition whereupon the film is in condition for subsequent use for packing purposes including heat shrinking, or the like, and the film may be wound on a supply roll thereof.

The air 35 is supplied to the die 21 through a conduit 40, see FIG. 1, from a suitable air pressure source 41 and an adjustable air pressure regulator 42 may be provided in the conduit 40 to control the air pressure within precise limits. As seen in FIG. 2, the conduit 40 is connected to a suitable connector 43 provided in one of a plurality of screws 44, of different sizes, used to fasten together various component portions of the die body 22. The connector 43 communicates with a passage 45 which extends axially through the one screw 44 and the passage 45 communicates at its inner end with another passage 46 which extends approximately axially through the central portion 47 of the die body 22 to thereby provide a complete flow path for the air 35 used to inflate the film bubble 37 in the manner previously mentioned.

The plastic melt 24 which is received in the inlet 23 of the die body 22 is radially expanded or flowed in a diverging manner using any suitable means within the die body 22 and as shown at 50 in this example is expanded by flowing the melt 24 in a plurality of radially diverging passages which may be defined by a spider assembly, or the like. The melt 24 then continues through an annulus 51 defined in the die body 22 and the annulus 51 has the outlet or discharge orifice 25 of the die 21 provided as an integral part thereof, whereby plastic melt 24 is extruded from the orifice 25 in tubular form as previously mentioned.

The die 21 has a heat conductive band which is designated generally by the reference numeral 52 supported by the die body 22 and in particular is supported by a ring-like portion 53 at the discharge end of the die body 22. The band 52 is made so that it has a circumferential heat conductivity which is better than its radial, radially inwardly in this example, heat conductivity whereby the conductivity of band 52 about the periphery of the die and thus about the periphery of the annulus 51 and its discharge orifice 25 is better than the heat conductivity toward a central longitudinal axis 55 through the die 21.

The die 21 has a heater 56 for heating the band 52 about the periphery of such band; and, the band 52 is constructed and arranged so that it assures that heat is transmitted so that practically all points of an annular portion indicated at 57 in FIG. 2 of the die body 22 and in particular annular portion 57 in the ring-like portion 53 of such die body located immediately adjacent the band 52 are substantially at the same temperature. This assures uniform heating of the melt in the annulus 51 and practically no concentrated hot spots or cold spots in the plastic melt 24 flowing through the melt annulus 51 thereby assuring precision flow of the melt therethrough with a minimum likelihood of degradation.

The die 21 has a second heat conductive band also designated by the same reference numeral 52 arranged in axially spaced relation (as measured along axis 55) from the first band and the second band 52 is positioned adjacent the inlet end of the die 21. The second band 52 also has a circumferential heat conductivity which is better than its radial heat conductivity; and, the second band 52 has a second heater also designated by the same reference numeral 56 for heating the second band 52 so that all points of an annular portion in this instance indicated at 60 of the die body and in particular the points of annular portion 60 in a portion 61 of the die body arranged closely adjacent the inlet 23 are substantially at the same temperature. Thus, the plastic melt in the diverging portion 50 is precisely controlled to minimize local hot spots or cold spots thereby assuring precision diverging flow of the plastic melt toward the inlet end of the melt annulus 51.

The die body 22 has an annular cutout or annular recess 62 therein at two axially spaced locations and each recess is adapted to receive an associated heat conductive band 52. Each recess 62 is defined by a plurality of cooperating walls which when viewed in cross section at one side thereof appear to have a roughly U-shaped configuration and the walls of each annular recess 62 include a right circular cylindrical wall 63 which is arranged concentrically around the central axis 55 of the die 21. Each cylindrical wall 63 is defined as an integral part of the die body and is arranged so that it presents a maximum surface area to the associated annular portion either 57 or 60 which it is heating.

The bands 52 provide precision heating at two axially spaced locations in the die body 22 so that an annular portion arranged radially inwardly of each heat conductive band 52 is maintained at substantially the same precise temperature which is determined by the temperature of its associated heater 56 which is externally controlled in temperature by a suitable temperature control device (not shown) of known construction.

Each of the heaters 56 is preferably an electrical resistance heater preferably in the form of a belt-like band or strap of known construction and operation whereby there is no need for further description thereof. It will also be seen that each heater 56 has an axial length 64 which is no greater than the corresponding axial length of its heat conductive band 52 whereby the heat from each heater 56 is primarily a conductive heating and is transmitted directly to its associated heat conductive band rather than to adjoining structure. Each heater 56 also has suitable terminals indicated at 66 which are made in accordance with techniques which are well known in the art and the terminals 66 are particularly adapted to be provided with electrical power from a suitable power source (not shown).

Thus, it is seen that this invention provides the use of a simple electrical resistance heating band or heater 56 in cooperation with a unique heat conductive band 52 and the band 52 is such that there is rapid heat conduction about its entire periphery whereupon there is heat conduction radially inwardly and hence substantially uniform heating about the entire periphery of the die beneath the heating band 52. The circumferential heat conduction in band 52 is so rapid as compared to the radial heat conduction that there is a smoothing effect of the heating action and a tendency for the die temperature to be the same adjacent an annular strip or part of the die surrounding the melt flowing therethrough. Also, there is a minimum tendency for differential thermal expansion and contraction of the die body and minimum possibility for variations in the viscosity of the melt 24 because the temperature of such melt is substantially uniform.

Each heat conductive band 52 is made of a heat conductive material having a heat conductivity which is better than the conductivity of the material, usually steel, used to make the die 21 and its component portions. In the example of FIG. 2 the band 52 is made of an elongated strip of metallic material and as shown in FIG. 3 such material is designated generally by the reference numeral 70. The strip 70 for many applications may be made of an aluminous material; however, such strip 70 may be made of copper, nickel, iron, or other materials having the desired heat conductivity. The strip 70 is wound in coil form within its associated recess 62 and with its inner turn, indicated at 71, wound against the right circular cylindrical surface or wall 63. The elongated strip 70 is preferably in the form of a metal foil and when wound to define the band 52 has a large number of coils or turns thereby providing many metal-to-metal interfaces which provide relatively poor radial conductivity. It will also be appreciated that the thickness of the strip of metallic material can be precisely controlled to thereby more precisely control the circumferential heat conductivity and simultaneously control the number of interfaces in the band 52 and hence the radial heat conductivity as well.

The band 52 may be made of a suitable metallic wire 73 which in the example of FIG. 4 is shown as having a circular cross-sectional configuration; however, it will be appreciated that such wire may have any suitable cross-sectional configuration. The wire 73 for many applications may be made of copper; however, as in the case of the strip 70 the wire 73 may be made of aluminum, nickel, iron, or other materials having the desired heat conductivity. The wire 73 is wound in a spool-like manner within its associated recess 62 and so that the inner turn 74 thereof is wound directly against the right circular cylindrical wall 63.

However, regardless of the material selected to make the heat conductive band 52, it will be appreciated that such band is constructed so that it provides a circumferential heat conductivity which is substantially better than its radial conductivity.

Figure 5:
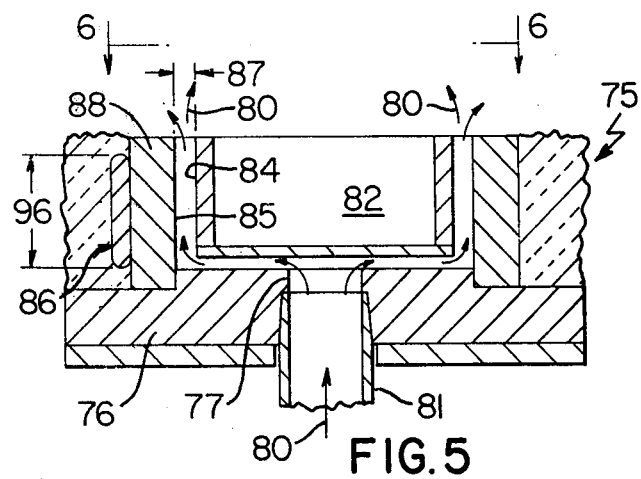
FIG. 5 is a fragmentary cross-sectional view of a test apparatus used to prove the concept of this invention and showing an electrical resistance heater fastened in position on an ordinary steel ring.

Various tests were conducted to prove the concept of this invention and such tests will now be discussed in connection with FIGS. 5, 5A, 5B, 5C, 6 and 7. In particular, a test fixture 75, as shown in FIG. 5, was used to conduct these various tests. The fixture 75 comprises a supporting structure 76 having a central opening 77 therethrough which is provided with compressed air designated by arrows 80 at 5 psig through a one-inch inside diameter pipe 81. The fixture 75 has a cylindrical central portion 82 suitably supported in the top portion thereof so as to provide a flow passage from the center of the pipe radially outwardly and concentrically around the central portion 82 as shown by the air flow arrows. The air under pressure flows from the outlet of the pipe 81 into a disc-like recess and then out a right circular cylindrical annulus defined between the outside cylindrical surface 84 of portion 82 and the inside cylindrical surface 85 of a readily interchangeable ring assembly 86 used with the fixture 75. The thickness of the air flow annulus between surfaces 84 and 85 is indicated at 87 and is one fourth inch. During the tests air was supplied to the fixture 75 at an air inlet temperature of 80° F and for these tests the heat transfer coefficient was assumed at 13 BTU/hour $\times$ Ft$^2$ $\times$ ° F. A plurality of assemblies 86 were installed and tested in the test apparatus 75 and such assemblies included the assembly 86 also shown in FIG. 5A, an assembly also designated 86 and shown in FIG. 5B, and an assembly also designated 86 and shown in FIG. 5C.

Figure 5A:
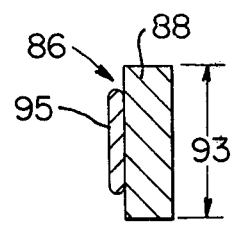
FIG. 5A is a cross-sectional view showing only the one side of the steel ring which has the electrical resistance heater attached thereagainst.

As seen in FIG. 6, the assembly 86 has a steel ring 88 which has an inside diameter shown at 90, an outside diameter shown at 91, a thickness indicated at 92, and a height indicated at 93 in FIG. 5A. Typical dimensions for the steel ring 88 of assembly 86 are 4 inches, 5¼ inches, 5/8 inch, and 2 inches for the respective dimensions at 90, 91, 92, and 93.

The assembly 86 also uses an electrical resistance heater 95 of conventional construction and such heater has a height 96 of 1½ inches. The heater 95 is 6 inches long as measured along the circumference thereof as shown at 97 in FIG. 6.

Figure 5B:
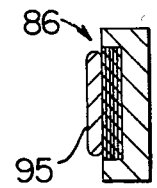
FIG. 5B is a view similar to FIG. 5A showing one test embodiment of a heat conductive band used with the heater and a steel ring similar to the steel ring of FIG. 5.
Figure 5C:
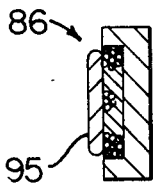
FIG. 5C is a view similar to FIG. 5B showing another test embodiment of a heat conductive band used with the heater and steel ring of FIG. 5B.

To measure the heat conductivity of a ring made of the usual steel material used to make a die and shown in FIG. 5A, as compared with a ring using a heat conductive band of this invention (whether made of aluminum foil as shown in FIG. 5B or copper as shown in FIG. 5C) thermocouples were placed on the inside surface of the steel band 83 at locations or points 100, 101, 102 and 103. The thermocouples were at various angles from the diametral line 105 which passes through the center of the heater. With the thermocouples thus placed and 80° F, 5 psig air flowing through the fixture 75 as indicated by the arrows in FIG. 5 the heater was turned on and the whole apparatus was allowed to equilibrate to steady state conditions while using point 102 as the control point set at 200° F. The temperatures at points 100-103 were recorded and plotted versus angular position around ring from the heater centerline 105 as indicated in FIG. 7.

The heater 95 being only 6 inches long provided a grossly nonsymmetrical heating of the ring 88 and this made possible a test of the ability of the ring to spread the heat around the entire inside surface 85. Measurement of the surface temperatures at points 100-103 angularly spaced from the heater center provided a direct measurement of the quality of heat distribution on the test apparatus.

It will be appreciated that for these tests the assemblies of FIGS. 5B and 5C were provided with heat conductive bands similar to the bands of FIGS. 3 and 4 respectively and such heat conductive bands were embedded in an annular recess of a steel ring identical to steel ring 88 except for such recess.

Figure 7:
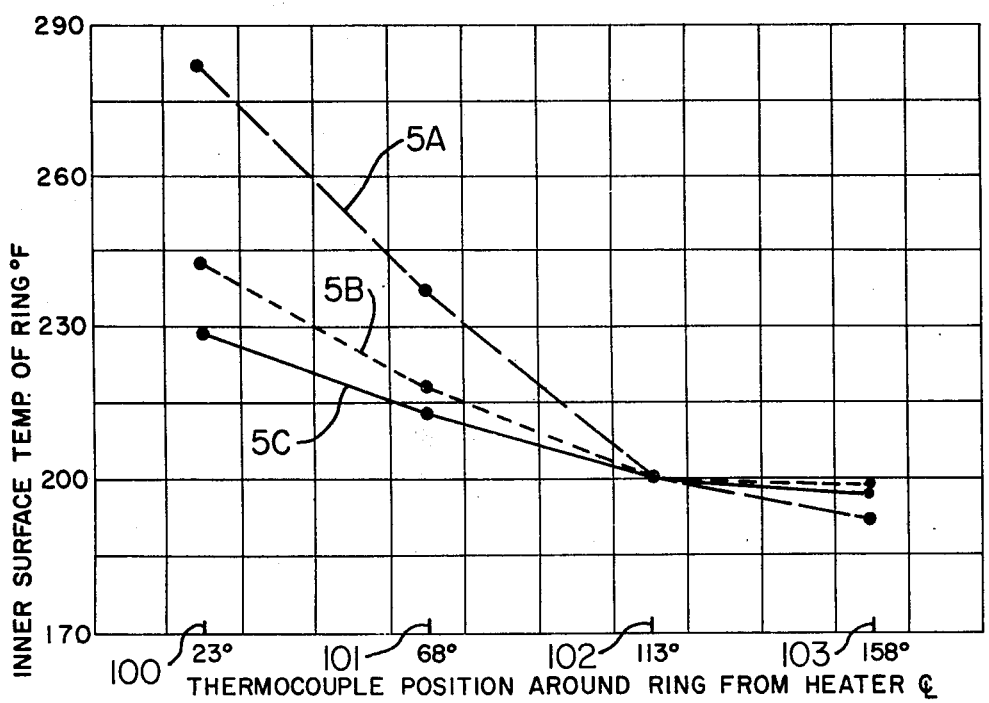
FIG. 7 is a graph presenting the results of tests made using the apparatus of FIG. 5.

Referring now to the graph of FIG. 7 it will be seen that three curves are presented and designated by the numerals 5A, 5B, and 5C to correspond to the data obtained using the assemblies of FIGS. 5A, 5B, and 5C. The curves of FIG. 7 represent a plot of inner surface temperatures in ° F at angularly spaced positions from the heater center as measured by thermocouples 100, 101, 102, and 103.

In each instance when using a heat conductive band similar to the band of this invention the temperature differentials between thermocouples 100-103 were significantly reduced. For example, equivalent temperature differentials on the inner surface 85 of ring 88 were reduced about 68% when comparing the assembly of FIG. 5C with the assembly of FIG. 5A and such temperature differentials were reduced about 56% when comparing the assembly of FIG. 5B with the assembly of FIG. 5A.

The test data presented above was obtained using a 6 inch long electrical heater 95 which only stretches around a small arcuate portion of the ring 88. It will be appreciated that in actual practice the heater will extend substantially completely around the entire periphery of the associated heat conductive band and die. Therefore, it will be appreciated that the circumferential heat conductivity of the band will be almost instantaneous about the entire periphery of the band whereupon the band then operates to conduct heat radially inwardly in a manner which is controlled by the number of interfaces in the material defining the band.

In this disclosure of the invention each heat conductive band and electrical resistance heater is shown arranged concentrically outwardly of the melt annulus and the plastic material flowing through the die; however, it is to be understood that the concept of this invention is fully applicable to the utilization of such a heat conductive band and electrical resistance heater within the die itself whereupon suitable electrical leads may be provided externally of the die and in accordance with techniques which are well known in the art.

The plastic melt is expanded or diverged outwardly in the die disclosed herein to define a larger tubular portion through a spider assembly; however, it will be appreciated that any suitable technique known in the art may be provided to achieve this melt expanding or diverging action.

The heat conductive bands of this invention may be employed in any desired number including a single band, two bands as shown, or more than two bands, together with their associated heaters.

It will also be appreciated that this invention is fully applicable to stationary extrusion dies, oscillating disc, or fully rotating dies and in each instance suitable mechanisms are provided and suitable electrical connections as is known in the art.

While present exemplary embodiments of this invention and methods of practicing the same, have been illustrated and described, it will be recognized that this invention may be otherwise variously embodied and practiced within the scope of the following claims.

What is claimed is:

1. A method of extruding plastic film through a die comprising the steps of, feeding a plastic melt under pressure to the die inlet, expanding the melt within the die to form an annulus of plastic melt, supporting a heat conductive band against said die, said supporting step comprising the steps of providing an elongated member of an easily windable heat conductive metallic material and winding said elongated member in a plurality of closely wound adjoining turns to define said band wherein said turns provide a plurality of interfaces therebetween which assure said band has a circumferential heat conductivity which is better than its radial heat conductivity, extruding said melt annulus through a die orifice and solidifying the melt into a plastic tube, and heating said band with a heater disposed against a portion of said band, said band assuring that heat is transmitted so that practically all points of an annular portion of said die body located adjacent said band are substantially at the same temperature to assure flow of said melt with optimum efficiency through said die.

2. A method as set forth in claim 1 in which said supporting step comprises supporting said heat conductive band in an annular recess in said die and said heating step comprises attaching said heater to said die with said heater against said portion of said band.

3. A method as set forth in claim 2 in which said supporting step comprises supporting said heat conductive band concentrically around said annulus adjacent said die orifice.

4. A method as set forth in claim 2 in which said step of providing an elongated member comprises providing an elongated member comprises providing an elongated wire containing copper.

5. A method as set forth in claim 2 in which said step of providing an elongated member comprises providing an elongated strip of aluminum foil.

6. A method as set forth in claim 2 in which said attaching step comprises attaching an electrical resistance heater to said die.

7. A method as set forth in claim 1 in which said supporting step comprises the preparation step of cutting an annular recess in said die from the outer periphery thereof toward a central longitudinal axis therethrough so as to define a cylindrical surface of said die surrounding said melt, and said winding step comprises winding the elongated member in coil form in said recess to define said band and with an inner turn thereof against said cylindrical surface.

8. A method as set forth in claim 7 wherein said heating step comprises attaching an electrical resistance band-type heater to said die with said heater against an outer surface of said heat conductive band to provide said heating.

* * * * *